United States Patent [19]
Schülze et al.

[11] 4,119,626
[45] Oct. 10, 1978

[54] DEPOT STEROID ESTERS

[75] Inventors: Paul-Eberhard Schülze; Ulrich Speck; Dieter Bittler; Rudolf Wiechert; Bernard Acksteiner, all of Berlin, Fed. Rep. of Germany

[73] Assignee: Schering, A.G., Fed. Rep. of Germany

[21] Appl. No.: 748,411

[22] Filed: Dec. 8, 1976

[30] Foreign Application Priority Data

Dec. 19, 1975 [DE] Fed. Rep. of Germany ....... 2558076

[51] Int. Cl.$^2$ ............................................. C07J 21/00
[52] U.S. Cl. ......................... 260/239.55 C; 260/397.4; 260/397.45; 260/397.5
[58] Field of Search ............. 260/397.45, 397.4, 397.5

[56] References Cited
U.S. PATENT DOCUMENTS

| 3,629,245 | 12/1971 | Bertin et al. | 424/241 |
| 3,657,225 | 4/1972 | Komeno | 424/241 |
| 3,856,956 | 12/1974 | Oxley et al. | 260/397.45 |
| 3,916,002 | 10/1975 | Taubert et al. | 424/241 |

Primary Examiner—Elbert L. Roberts
Attorney, Agent, or Firm—Millen & White

[57] ABSTRACT

Steroid esters of the Formula I

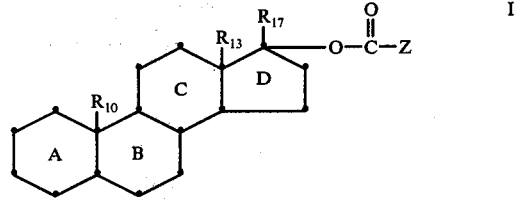

wherein the A, B, C, and D rings can be substituted in the usual manner, $R_{10}$ is hydrogen or methyl;
$R_{13}$ is alkyl of 1-3 carbon atoms;
$R_{17}$ is 17α-alkynyl or alkadiinyl of up to 4 carbon atoms or 17β-acetyl,
Z is X—OH, Y—CO—OH, X—O—CO—Y—CO—OH, X—O—CO—R, Y—CO—OR, X—O—CO—Y—CO—OR, or X—O—SO$_2$—R;
X is a straight-chain or branched alkylene of 1-6 carbon atoms, optionally interrupted by O or S atoms, wherein the chain or branches can be substituted by —OH, —O—CO—R, or —O—SO$_2$—R;
Y is a direct bond, a straight-chain or branched carbon chain of 1-3 atoms, optionally interrupted by an O or S atom if Y is linked to the steroid residue via —O—CO—; of 1-16 atoms if Y is linked to X via —O—CO; or 1,4-phenylene, 1,4-cyclohexylene, or 1,3-cyclopentylene optionally substituted by alkyl of 1-2 carbon atoms, or groups analogously 1,2- and 1,3-disubstituted, respectively; and
R is an optionally substituted alkyl of up to 22 carbon atoms, have longer acting activity than the corresponding unesterified steroids and higher activity than the corresponding long chain esters.

37 Claims, No Drawings

DEPOT STEROID ESTERS

BACKGROUND OF THE INVENTION

It is known that protracted effectiveness can be achieved by esterifying biologically active steroid alcohols with long-chain, branched, or cyclic fatty acids and/or by converting biologically active lower esters of steroid alcohols into higher esters.

The chain length or the branching of the fatty acid is the factor governing the desired protracting effect. It is possible, for example, to obtain considerable protracting effect with an undecylate, but a considerable decrease in effectiveness must be tolerated as a consequence of greatly diminished cleavage of the steroid ester liberated from the depot. Since saponification of a tertiary ester takes place very gradually compared to metabolism or direct excretion of the ester, physiologically undesirably high doses of the long-chain ester must be administered to attain the therapeutic effect of the alcohol.

It has now been found that the depot steroid esters of this invention are either completely or almost completely saponified, yielding correspondingly high levels of activity and that the saponification rate and thus the period of activity can be controlled by the selection of X, Y and R of Formulae I, II, and III.

SUMMARY OF THE INVENTION

In a compositional aspect, this invention relates to a depot steroidal ester of the cyclopentanopolyhydrophenanthrene series having at the 13-position an alkyl of 1-3 carbon atoms; at the 10-position H or methyl; and at the 17-position (a) a 17α-alkynyl or alkadiinyl of up to 4 carbon atoms or (b) a 17β-acetyl and, in the opposition configuration,

wherein

Z is alkenyl of up to 4 carbon atoms, X-OH, Y-CO-OH, X-O-CO-Y-CO-OH, X-O-CO-R, Y-CO-OR, X-O-CO-Y-CO-Or, or X-O-SO$_2$-R, and X is a straight-chain or branched alkylene, oxalkylene or thiaalkylene of 1-6 carbon atoms, unsubstituted or substituted by an —OH, —O-CO-R, or —O-SO$_2$-R;

Y is a direct bond, a straight-chain or branched alkylene, oxaalkylene or thiaalkylene of 1-3 carbon atoms when Y is linked at the 17-position of the steroid residue via -O-CO-; alkylene, oxaalkylene or thiaalkylene of 1-16 carbon atoms, unsubstituted or substituted by an -OH, -OCOR, or -OSO$_2$R when Y is linked to X via —O-CO-; or 1,4-phenylene, 1,4-cyclohexylene, or 1,3-cyclopentylene substituted by up to two alkyl of 1-2 carbon atoms, and R is alkyl or oxaalkyl of up to 22 carbon atoms.

In another compositional aspect, this invention relates to a pharmaceutical composition, comprising a depot steroidal ester, as above, in admixture with a pharmaceutically acceptable carrier.

This invention also relates to a process for the production of the novel depot esters, by conventionally esterifying steroid alcohols of the formula

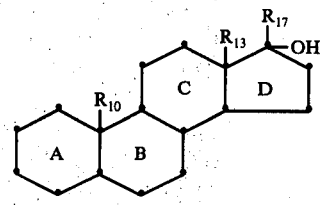

wherein the A, B, C, and D rings can be substituted in the usual manner and R$_{10}$, R$_{13}$, and R$_{17}$ are as above.

DETAILED DESCRIPTION

The steroid molecule can be further substituted by the usual substituents, examples of which include: etherified or esterified hydroxy in the α- or β-configuration at the 1-, 2-, 3-, 4-, 7-, 11-, 15- and/or 16-position; keto in the 3-, 6- and/or 11-position; saturated or unsaturated alkyl of 1-5 carbon atoms, preferably methyl or ethyl, in the 1-, 2-, 4-, 6-, 7- and/or 16-position; methylene in the 1,2-, 6,7- and/or 15,16-position; halogen, preferably fluorine or chlorine, in the 2-, 4-, 6-, 7-, 9-, 11- and/or 16-position.

The A, B, C, and D rings can be saturated or unsaturated, that is, double bonds can be present, for example, in the 1(2)-, 3(4)-, 4(5)-, 5(10)-, 5(6)-, 6(7)-, 9(10)-, 9(11)-, 11(12)- and/or 15(16)-positions.

R$_{17}$ alkynyl includes ethynyl, chloroethynyl, propynyl, and butadiynyl, of which ethynyl is preferred.

X is straight-chain or branched alkylene of 1-6 carbon atoms, optionally interrupted by O or S atoms. The branched groups as well as the end groups of X can be substituted by —OH, —O-CO-R, or -O-SO$_2$-R. For example, X can be:

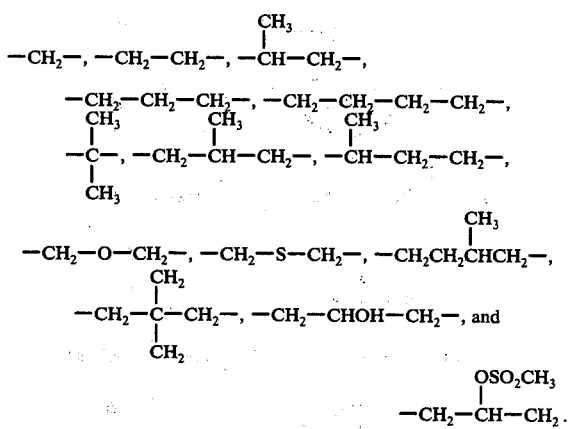

Y is a direct carbon-carbon bond, a straight or branched carbon chain of 1-3 atoms, optionally interrupted by an O or S atom, for example —CH$_2$-, -CH$_2$-CH$_2$-,

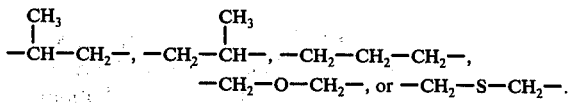

Also, Y can be 1,4-phenylene, 1,4-cyclohexylene, or 1,3-cyclopentylene group, optionally substituted by alkyl of 1-2 carbon atoms. If Y is linked to X by -O-CO-, Y can also be a carbon chain of 1-16 atoms, optionally interrupted by one or more O or S atoms.

R is an univalent hydrocarbon residue of the aliphatic, cycloaliphatic, aromatic, aromatic-aliphatic, or heterocyclic series. The hydrocarbon residue can be saturated, unsaturated, and/or substituted, for example, by alkoxy, oxo, amino, and halogen atoms. R can be of up to 22 carbon atoms, preferably 4-18 carbon atoms.

Examples of R and contemplated equivalents include, but are not limited to: alkyl, and substituted alkyl, e.g., methyl, diethylaminomethyl, chloromethyl, ethyl, propyl, isopropyl, butyl, isobutyl, tert.-butyl, pentyl, isopentyl, tert.-pentyl, 2-methylbutyl, hexyl, heptyl, octyl, nonyl, decyl, dodecyl, pentadecyl, hexadecyl, and octadecyl; cycloalkyl, e.g., cyclopentyl, cyclohexyl, and cyclopentylmethyl; aryl, e.g., phenyl, benzyl, 2-phenethyl, tolyl, cinnamyl, α- and β-naphthyl; heterocyclic groups, e.g., pyridyl, piperidyl, pyrrolidinyl, furanyl, piperidinomethyl, and morpholinomethyl; and hydrocarbon groups interrupted by oxygen, e.g., 3,6,9-trioxaisoundecane.

Preferred depot steroid esters are compounds of Formula II

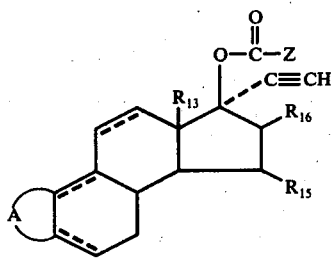

wherein $R_{13}$ and Z are as in Formula I; the dashed lines are optional, double carbon-carbon bonds;

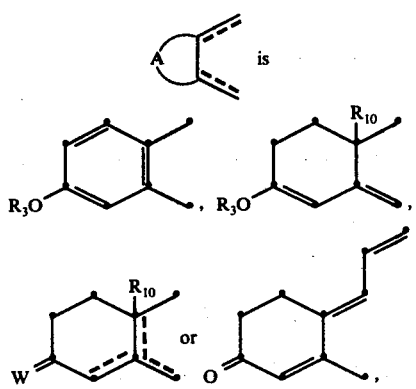

$R_{10}$ is hydrogen or methyl;
$R_3$ is hydrogen, lower alkanoyl, alkylsulfonyl, alkyl, or cycloalkyl;
W is $H_2$, O, or $H,OR_3$;

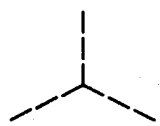

is a double bond in the 4,5-, 5,6-, or 5,10- position; and
$R_{15}$ and $R_{16}$ each are hydrogen or collectively are methylene in the α- or β-position or an additional carbon-carbon bond between the $C_{15}$ and $C_{16}$ carbon atoms.

Preferred lower alkanoyl $R_3$ are acetyl, propionyl, and butyryl. Alkyl or alkyl in alkylsulfonyl are likewise of 1-4 carbon atoms, for example, methyl, ethyl, propyl, isopropyl, butyl, isobutyl, and tert.-butyl. Cycloalkyl are of 3-8 carbon atoms, of which cyclopentyl is preferred.

Other preferred depot steroid esters are compounds of Formula III

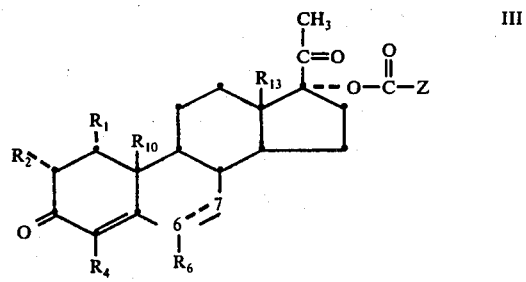

wherein $R_{10}$, $R_{13}$, and Z are as in Formula I,
$R_1$ and $R_2$ each are hydrogen or collectively are methylene or a further carbon-carbon bond between the $C_1$ and $C_2$ carbon atoms,
$R_4$ is hydrogen or chlorine,
$R_6$ is hydrogen, chlorine or methyl, and
6=7 is a single or double bond between the $C_6$ and $C_7$ carbon atoms.

Included within the compounds of the invention are compounds of Formula I, wherein:
(a) $R_{17}$ is 17α-alkynyl;
(b) $R_{17}$ is 17β-acetyl;
(c) Z is alkenyl of up to 4 carbon atoms, including (a)-(b);
(d) Z is $CH_2OH$, or $CH_2OCOR$, including (a)-(b);
(e) Z is $CH_2CH_2OH$ or $CH_2CH_2OCOR$, including (a)-(b);
(f) Z is $CH_2COOH$, or $CH_2COOR$, including (a)-(b);
(g) Z is COOH or COOR, including (a)-(b);
(h) Z is

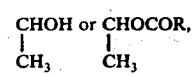

including (a)-(b);
(i) Z is

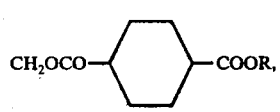

including (a)-(b);
(j) Z is

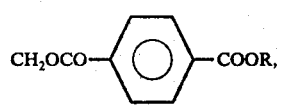

including (a)-(b);
(k) Z is $CH_2OSO_2R$, including (a)-(b);
(l) Z is $CH_2CH_2CH_2OCOR$, including (a)-(b);
(m)

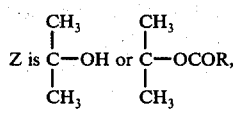

including (a)–(b);

(n) R is oxaalkyl of up to 22 carbon atoms including (a)–(m);

(o) R is alkyl of up to 22 carbon including (a)–(m).

Also, within the compounds of this invention are 17α- or 17β-thioesters, e.g., 17-carbomethoxy-thioacetoxy and methoxycarbonyl-methylthioacetoxy steroids.

The depot steroid esters of this invention have higher levels of effectiveness than steroid esters known heretofore. The increase in effectiveness is up to 800%. The novel steroid esters have the same pharmacological properties as conventional, corresponding steroid alcohols from which they are produced, but have particularly strong estrogenic and/or progestational activities.

Whereas usually, following esterification of the tertiary 17-hydroxy group during in vitro experiments, there is no longer a receptor linking to the steroid, a receptor linkage is present in the 17-hydroxy esters (Z is X-OH) of this invention, e.g., in case of the 17-glycolates, which is diminished in receptor linking merely by a factor of 3–4 with respect to the steroid alcohol. Thus, the desired therapeutic effect is even enhanced, because pharmacologically effective compounds are already present even before cleavage of the hydroxy esters.

The novel tertiary depot esters are produced by esterification with a short-chain hydroxy- or carboxycarboxylic acid, HO-X-COOH or HOOC-Y-COOH, respectively, and optionally further esterification of an initially obtained hydroxy- or carboxy- carboxylic acid ester with another carboxylic acid (R-COOH), dicarboxylic acid (HOOC-Y-COOH), sulfonic acid (R-SO₂OH) and/or an alcohol (R-OH), or by esterification with the desired acylated hydroxycarboxylic acid and/or or mono-esterified carboxycarboxylic acid. In this way, compounds having one, two, or three esters groups are obtained.

The length and structure, especially of the second and optionally third ester group, determine the duration of activity. By esterification with hydroxy- and carboxycarboxylic acids, fat solubility of the steroid is increased and, in many cases, the melting point is simultaneously raised. Consequently, several of the novel depot esters can be administered intramuscularly in an oily solution as well as in an aqueous microcrystal suspension.

Esterification of the 17α-hydroxy is carried out by methods generally known to those skilled in the art. The steroid alcohol can be dissolved in an inert solvent and reacted with the desired acid anhydride or halide in the presence of an acidic or alkaline catalyst at temperatures of 0°–150° C.

A steroid alcohol can be reacted with a free hydroxycarboxylic acid or a hydroxycarboxylic acid esterified on the hydroxy group, or with a free or mono-esterified dicarboxylic acid by treatment with trifluoroacetic anhydride in an inert solvent, optionally with addition of an acidic catalyst, at temperatures between about 0° C. and 40° C.

Examples of acidic catalysts are p-toluenesulfonic acid, perchloric acid and sulfuric acid. Basic catalysts, which can also serve as the solvent, are, for example, triethylamine, pyridine, and collidine.

Any inert solvent can serve as reaction medium, but benzene or aromatic solvents, such as toluene or chlorobenzene, are preferred, along with ethers, such as diethyl ether, dioxane or tetrahydrofuran; hydrocarbons, such as hexane; halogenated hydrocarbons, such as methylene chloride, ethylene chloride or chloroform; and polar solvents; e.g., acetonitrile and dimethyl sulfoxide.

A hydroxy ester (X-OH) obtained from a hydroxy fatty acid can be esterified on the free hydroxy group in the customary manner. Esterification agents are preferably acid anhydrides or halides, in the presence of a basic catalyst. Reaction temperatures are about 0°–100° C. The hydroxy fatty acids can contain 1–3 hydroxy groups, preferably 1 hydroxy group.

An acyloxy fatty acid ester (Z is X-O-CO-R) obtained from an acyloxy fatty acid can be saponified with a catalytic amount of a solution of an alkali metal or alkaline earth metal hydroxide in alcohol at temperatures between about 0° and 50° C. and reactions times of 1 minutes to 3 hours.

The reaction mixture can also contain inert solvents and diluents, such as methylene chloride, diethyl ether, and tetrahydrofuran. If desired, esterification can be carried out in a second step after saponification with the desired carboxylic or sulfonic acid (R-COOH or R-SO₂OH) or dicarboxylic acid (HOOC-Y-COOH).

The optional esterification of a free carboxy group of an initially formed mono-ester (Y-CO-OH) takes place likewise according to conventional methods. Thus, a mono-ester can be reacted, for example, with diazomethane or diazoethane, to obtain the corresponding methyl or ethyl ester. A generally applicable method is reaction of a mono-ester with an alcohol in the presence of carbonyl diimidazole, dicyclohexylcarbodiimide, or trifluoroacetic anhydride. It is also possible to convert an acid to a silver salt and react the latter with a R-halogenide. A further method is in conversion of a mono-ester with a free carboxyl group to the corresponding alkyl ester by an intermediate corresponding dimethylformamide alkyl acetal.

A mono-ester can be reacted in the presence of a strongly acidic catalyst, such as hydrogen chloride, sulfuric acid, perchloric acid, trimethylsulfonic acid, or p-toluenesulfonic acid with an alcohol or a lower alkanecarboxylic acid ester of an alcohol. The carboxy of a mono-ester can be converted to an acid chloride or anhydride and then reacted with an alcohol in the presence of a basic catalyst.

It is frequently advantageous first to prepare, in a single step, a hydroxy or carboxy ester, respectively, esterified with a lower fatty acid or with a lower alcohol; to saponify this product to a free hydroxy or carboxy ester; and, as a final step, carry out esterification with an acid or an alcohol of the desired chain length.

The 17-glycolic acid esters can be prepared as follows:

(1) A 17-crotonic acid ester is prepared using crotonic acid in the presence of trifluoroacetic anhydride.

(2) After blocking any keto groups which are present, for example, in the 3- or 3,20-positions, preferably by ketalization, an oxidation is conducted with potassium permanganate in the presence of formic acid at temperatures around the freezing point, to obtain a 2,3-dihydroxybutyric acid ester.

(3) By oxidative cleavage with periodate at temperatures between about 0° and 50° C., a 17-glyoxylic acid ester, which is converted into the desired glycolic acid ester during the reduction, is obtained.

Oxidation with permanganate and oxidative splitting with periodate are conducted in aqueous, inert solvent, such as, for example, acetone, tetrahydrofurna, and dioxane. The reduction can be effected in the usual manner with alkali metal boranate or lithium tri-tert.-butoxyalanate. Depending on the final product desired, any blocked keto groups present are liberated directly or after first esterifying a hydroxy group of the glycolic acid ester.

The invention also concerns pharmaceutical preparations, especially depot preparations, of the steroid esters of Formula I.

The progestationally and/or estrogenically active steroid esters are suitable, for example, for fertility control in humans and animals or for the treatment of climacteric complaints in women. Also combinations of, for example, progestational and estrogenic, or estrogenic and androgenic steroid esters are possible.

The effective dose depends on the purpose of the treatment, on the type of active agent, and on the desired duration of effectiveness. The effective dose of, for example, 17α-ethynyl-18-methyl-17β-(O-undecanoylglycoloyoxy)-4-estren-3-one for fertility control in the human female is approximately 10-50 mg. for three months. The amount of other, progestationally active, steroid esters administered is equal to that corresponding to 10-50 mg. of 17α-ethynyl-18-methyl-17β-(O-undecanoylglycoloyloxy)-4-estren-3-one each three months.

The preparations are injected intramuscularly in an oily solution or in an aqueous crystalline suspension. The injection volume is about 1-4 ml., preferably 1-2 ml.

To produce the oily solution, the steroid esters are dissolved in an oily sovlent or solvent mixture suitable for the injection, filtered under sterile conditions, and charged into ampoules under aseptic conditions.

Examples of preferred oily solvents are sesame oil and castor oil. To increase the solubility of the active agent, it is possible to add solubilizers, for example, benzyl benzoate or benzyl alcohol, to the oily solvents.

Other vegetable oils which can be utilized include, e.g, linseed oil, cottonseed oil, sunflower oil, peanut oil, olive oil, and wheat-germ oil.

Synthetic oils, such as polyethylene glycol, triglycerides of higher saturated fatty acids and mono-esters of higher fatty acids are also useable.

A mixture of castor oil/benzyl benzoate in a ratio of 6:4 is a preferred solvent mixture.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. The temperature in the following examples is indicated in degrees Celsius.

EXAMPLE 1

30.9 g. of crotonic acid is combined in 800 ml. of benzene with 48.1 ml. of trifluoroacetic anhydride and stirred for 30 minutes at room temperature. Then, 50 g. of 17α-ethynyl-17β-hydroxy-18-methyl-4-estren-3-one is added thereto and the mixture agitated for 30 minutes at room temperature. The reaction solution is diluted with ether, washed with water and sodium bicarbonate solution, dried, and evaporated. The residue is taken up in 1.3 l. of methanol for enol ester cleavage, combined with 130 ml. of 8 vol.-% sulfuric acid, and heated under reflux for 2 hours. After precipitation in ice water, the precipitate is filtered off, washed with water, taken up in methylene chloride, and dried. The residue obtained after evaporation is recrystallized from diisopropyl ether-acetone, thus obtaining 43.3 g. of 17α-ethynyl-17β-crotonoyloxy-18-methyl-4-estren-3-one, m.p. 187°-188°.

UV: $\epsilon_{211} = 18,700$; $\epsilon_{238} = 18,100$.

45 g. of 17α-ethynyl-17β-crotonoyloxy-18-methyl-4-estren-3-one is combined in 450 ml. of methylene chloride with 90 ml. of triethyl orthoformate, 112 g. of 2,2-dimethyl-1,3-propanediol, and 450 mg. of p-toluenesulfonic acid and agitated for 60 minutes at a bath temperature of 50°. The mixture is then diluted with ether, washed with sodium bicarbonate solution and water, dried, and evaporated. The residue is chromatographed on silica gel, thus producing 39.5 g. of 17α-ethynyl-17β-crotonoyloxy-3,3-(2,2-dimethyltrimethylenedioxy)-18-methyl-5- and -5(10)-estrene in the form of an oil.

40 g. of 17α-ethynyl-17β-crotonoyloxy-3,3-(2,2-dimethyltrimethylenedioxy)-18-methyl-5- and -5(10)-estrene is dissolved in 1.5 l. of acetone, cooled in an ice bath, and then 11.2 ml. of 100% formic acid is added to the reaction mixture. Within 2 hours, a solution of 23.7 g. of potassium permanganate in 395 ml. of water and 3.3 l. of acetone is also added to the mixture, whereafter the latter is agitated for 30 minutes at 0°. One liter of methylene chloride is added, and the mixture is filtered off from the thus-separated manganese dioxide. The filtrate is extensively concentrated under vacuum; the residue is taken up in ether, washed with water, dried, and evaporated. After chromatography on silica gel, the product is, in addition to 12 g. of unreacted starting material, 30.2 g. of 17α-ethynyl-17β-(2,2-dihydroxybutyryloxy)-3,3-(2,2-dimethyltrimethylenedioxy)-18-methyl-5- and -5(10)-estrene as an oil.

30 g. of 17α-ethynyl-17β-(2,2-dihydroxybutyryloxy)-3,3-(2,2-demethyltrimethylenedioxy)-18-methyl-5- and -5(10)-estrene is combined in 1.5 l. of dioxane with 89.6 g. of sodium periodate in 450 ml. of water; the mixture is then stirred for 1 hour at room temperature, stirred into ice water, extracted with methylene chloride, washed with water, and dried. After evaporation, the product is 28.5 g. of crude 17α-ethynyl-3,3-(2,2-dimethyltrimethylenedioxy)-17β-glyoxoyloxy-18-methyl-5- and -5(10)-estrene.

32.5 g. of crude 17α-ethynyl-3,3-(2,2-dimethyltrimethylenedioxy)-17β-glyoxoyloxy-18-methyl-5- and -5(10)-estrene is combined in 995 ml. of methanol and 142.5 ml. of water under ice cooling with incremental portions of 6.5 g. of sodium boranate. The mixture is then agitated for 10 minutes at the ice bath temperature and stirred into ice water. The precipitate-containing phase, acidified with 2N sulfuric acid, is extracted with ether, washed with water, and dried. The residue obtained after evaporation is chromatographed on silica gel, thus obtaining 30.5 g. of 17α-ethynyl-3,3-(2,2-dimethyltrimethylenedioxy)-17β-glycoloyloxy-18-methyl-5- and -5(10)-estrene. A sample recrystallized from diisopropyl ether melts at 215.5°-219°.

200 mg. of 17α-ethynyl-3,3-(2,2-dimethyltrimethylenedioxy)-17β-glycoloyloxy-18-methyl-5- and -5(10)-estrene is allowed to stand in 2 ml. of pyridine with 1 ml. of propionic anhydride for 3 hours at room temperature. The mixture is then stirred into ice water. The precipitate is filtered off, taken up in ether, washed with water and sodium bicarbonate solution, and dried. After evaporation, 240 mg. of crude 17α-ethynyl-3,3-(2,2-dimethyltrimethylenedioxy)-18-methyl-17β-(O-propionylglycoloyloxy)-5- and -5(10)-estrene is obtained.

240 mg. of crude 17α-ethynyl-3,3-(2,2-dimethyltrimethylenedioxy)-18-methyl-17β-(O-propionylglycoloyloxy)-5- and -5(10)-estrene is heated under reflux in 6 ml. of methanol and 1.2 ml. of water with 120 mg. of oxalic acid for one hour. The mixture is then diluted with ether, washed with water, and dried. After evaporation, the residue is chromatographed on silica gel, thus obtaining after recrystallization from diisopropyl ether 100 mg. of 17β-ethynyl-18-methyl-17β-(O-propionylglycoloyloxy)-4-estren-3-one, m.p. 125°–126°.

UV: $\epsilon_{240} = 17,500$.

EXAMPLE 2

4.0 g. of 17α-ethynyl-3,3-(2,2-dimethyltrimethylenedioxy)-17β-glycoloyloxy-18-methyl-5- and -5(10)-estrene is allowed to stand for 20 hours at room temperature in 12 ml. of pyridine and 8 ml. of enanthic anhydride. The mixture is then distilled with steam, the residue is taken up in methylene chloride, and dried. After evaporation, the mixture is chromatographed on silica gel, thus obtaining 3.8 g. of 17α-ethynyl-3,3-(2,2-dimethyltrimethylenedioxy)-17β-(O-heptanoylglycoloyloxy)-18-methyl-5- and -5(10)-estrene.

3.8 g. of 17α-ethynyl-3,3-(2,2-dimethyltrimethylenedioxy)-17β-(O-heptanoylglycoloyloxy)-18-methyl-5- and -5(10)-estrene is heated under reflux in 95 ml. of methanol and 19 ml. of water with 1.9 g. of oxalic acid for 90 minutes. The mixture is then stirred into ice water. The precipitate is filtered off, taken up in ether, washed with water, and dried. After evaporation, the product is chromatographed on silica gel, thus obtaining 2.0 g. of 17α-ethynyl-17β-(O-heptanoylglycoloyloxy)-18-methyl-4-estren-3-one, m.p. 90°–91°.

UV: $\epsilon_{240} = 17,000$.

EXAMPLE 3

4.0 g. of 17α-ethynyl-3,3-(2,2-dimethyltrimethylenedioxy)-17β-glycoloyloxy-18-methyl-5- and -5(10)-estrene is combined in 12 ml. of pyridine at ice bath temperature with 4 ml. of undecanoic acid chloride and allowed to stand for 20 hours at room temperature. After the reaction mixture has been worked up and purified analogously to Example 2, the product is 3.9 g. of 17β-ethynyl-3,3-(2,2-dimethyltrimethylenedioxy)-18-methyl-17β-(O-undecanoylglycoloyloxy)-5- and -5(10)-estrene. 3.9 g. of 17α-ethynyl-3,3-(2,2-dimethyltrimethylenedioxy)-18-methyl-17β-(O-undecanoylglycoloyloxy)-5- and -5(10)-estrene is heated under reflux in 95 ml. of methanol and 19.5 ml. of water with 1.95 g. of oxalic acid for 90 minutes. After the mixture has been worked up and purified analogously to Example 2, the product is 2.0 g. of 17α-ethynyl-18-methyl-17β-(0-undecanoylglycoloyloxy)-4-estren-3-one in the form of an oil.

UV: $\epsilon_{240} = 17,000$.

EXAMPLE 4

1.3 g. of 17α-ethynyl-3,3-(2,2-dimethyltrimethylenedioxy)-17β-glycoloyloxy-18-methyl-5- and -5(10)-estrene is stirred in 39 ml. of methanol with 3.9 ml. of 8 vol.-% sulfuric acid for 3 hours at room temperature. The mixture is then diluted with ether, washed with water, and dried. After evaporation, the residue is chromatographed on silica gel, thus obtaining after recrystallization from diisopropyl ether 620 mg. of 17α-ethynyl-17β-glycoloyloxy-18-methyl-4-estren-3-one, m.p. 158.5°–159.5°.

UV: $\epsilon_{240} = 17,600$.

EXAMPLE 5

100 mg. of 17α-ethynyl-17β-glycoloyloxy-18-methyl-4-estren-3-one is dissolved in 1 ml. of pyridine, and 160 mg. of 3-cyclopentylpropionyl chloride is added thereto under cooling. The mixture is allowed to stand for 24 hours at room temperature, stirred into ice water, taken up in ether, washed neutral, and, after drying and concentration, chromatographed on silica gel, thus obtaining 110 mg. of 17α-ethynyl-17β-[O-(3-cyclopentylpropionyl)-glycoloyloxy]-18-methyl-4-estren-3-one.

Analogously to Example 5, the following compounds are prepared:

17α-ethynyl-17β-(O-tridecanoylglycoloyloxy)-4-estren-3-one
17α-ethynyl-17β-(O-hexadecanoylglycoloyloxy)-4-estren-3-one
17α-ethynyl-17β-(0-octadecanoylglycoloyloxy)-4-estren-3-one
17β-ethynyl-17β-(O-tridecanoylglycoloyloxy)-18-methyl-4-estren-3-one
17α-ethynyl-17β-(O-tridecanoylglycoloyloxy)-18-methyl-4,15-estradien-3-one.

EXAMPLE 6

500 mg. of 17α-ethynyl-17β-hydroxy-18-methyl-4-estren-3-one is dissolved in 5 ml. of collidine (freshly distilled). With ice cooling, 180 mg. of 4-dimethylpyridine and 1.25 g. of 2-nonanoyloxypropionyl chloride are added to the reaction mixture. The latter is then heated under nitrogen for 24 hours to 110°. The reaction mixture is taken up in ether and washed neutral with aqueous oxalic acid solution and water. After the ether has been dried and the mixture concentrated under vacuum, the product is chromatographed on silica gel, thus obtaining 17α-ethynyl-17β-(2-nonanoyloxypropionyloxy)-18-methyl-4-estren-3-one.

EXAMPLE 7

(a) One gram of 3-acetoxypropionic acid is stirred in 21 ml. of benzene with 1.05 ml. of trifluoroacetic anhydride for 1 hour at room temperature. Under cooling and an N₂ atmosphere, 0.99 g. of 17α-ethynyl-17β-hydroxy-18-methyl-4-estren-3-one is added thereto and the mixture agitated for 24 hours.

The reaction solution is decomposed with methanol/water and washed neutral with water, sodium bicarbonate solution and once again water. The benzene solution is dried with sodium sulfate and concentrated under vacuum. The oily residue is chromatographed on silica gel, thus obtaining 650 mg. of 17β(3-acetoxypropionyloxy)-17α-ethynyl-18-methyl-4-estren-3-one.

UV: $\epsilon_{240} = 17,200$.

(b) 250 mg. of 17β-(3-acetoxypropionyloxy)-17α-ethynyl-18-methyl-4-estren-3-one is dissolved in 2 ml. of methylene chloride and 2 ml. of methanol and, under nitrogen, ethanolic KOH solution is added thereto at 5°. After 2 hours, the mixture is neutralized with glacial acetic acid and stirred into ice water. The thus-precipitated product is vacuumfiltered and dried. Chromatography on silica gel and recrystallization from diisopropyl ether yeilds 200 mg. of 17α-ethynyl-17β-(3-hydroxypropionyloxy)-18-methyl-4-estren-3-one, m.p. 159°-160°.

UV: $\epsilon_{240} = 16,400$.

EXAMPLE 8

(a) One gram of monoethyl malonate is stirred in 20 ml. of dry benzene with 1 ml. of trifluoroacetic anhydride for one hour at room temperature under a nitrogen atmosphere. The mixture is then combined with 0.93 g. of 17α-ethynyl-17β-hydroxy-18-methyl-4-estren-3-one and allowed to stand for 36 hours at room temperature. After adding methanol and ether, the mixture is washed neutral and concentrated. Chromatography on silica gel yields 550 mg. of 17α-ethynyl-17β-(ethoxymalonyloxy)-18-methyl-4-estren-3-one, m.p. 75°-95°. The substance which crystallizes spontaneously is tritrated with hexane and dried under a high vacuum).

UV: $\epsilon_{240} = 17,300$.

(b) 100 mg. of 17α-ethynyl-17β-(ethoxymalonyloxy)-18-methyl-4-estren-3-one is dissolved in 1 g. of dodecyl alcohol and 5 ml. of benzene at 40° and, under nitrogen, 5 mg. of potassium tert.-butylate is added thereto. After one hour, excess alcohol is removed under a high vacuum; the residue is neutralized with acetic acid and chromatographed on silica gel, thus obtaining 120 mg. of 17α-ethynyl-17β-(dodecyloxymalonyloxy)-18-methyl-4-estren-3-one.

UV: $\epsilon_{240} = 16,100$.

EXAMPLE 9

One gram of 17α-ethynyl-17β-hydroxy-4-estren-3-one is dissolved in 10 ml. of collidine. The solution is cooled to 0° and, under a nitrogen atmosphere, 1.3 ml. of ethoxyoxalyl chloride is added thereto. The mixture is allowed to stand for one hour at room temperature and then stirred into aqueous oxalic acid solution. The thus-precipitated product is vacuum-filtered, washed with water, and dried. After chromatography on silica gel, 770 mg. of 17α-ethynyl-17β-(ethoxyoxalyloxy)-4-estren-3-one is obtained, m.p. 89°-90°.

UV: $\epsilon_{240} = 17,000$.

EXAMPLE 10

100 mg. of 17α-ethynyl-17β-(ethoxyoxalyloxy)-4-estren-3-one is dissolved in 10 ml. of benzene, and 500 mg. of butanol is added thereto. At room temperature, 5 mg. of potassium tert.-butylate is added, and the mixture is agitated. The benzene is removed after adding acetic acid, and the residue is chromatographed on silica gel, thus producing 120 mg. of 17α-ethynyl-17β-(butoxyoxalyloxy)-4-estren-3-one.

EXAMPLE 11

50 mg. of 17α-ethynyl-17β-glycoloyloxy-4-estren-3-one is dissolved in 0.5 ml. of dry pyridine. Under ice cooling, 0.11 g. of 3,6,9-trioxaisodecanoyl chloride is added thereto. The mixture is allowed to stand at room temperature for 24 hours under nitrogen, then taken up in ether, washed with aqueous oxalic acid solution, and the ether phase is dried and concentrated. After chromatography on silica gel, the product is 64 mg. of 17α-ethynyl-17β-(O-10-methyl-3,6,9-trioxaundecanoyl-glycoloyloxy)-4-estren-3-one.

EXAMPLE 12

One gram of 17α-ethynyl-17β-hydroxy-4-estren-3-one is dissolved in 10 ml. of collidine (freshly distilled), and 250 mg. of 4-dimethylaminopyridine is added thereto. After cooling to +5°, 0.65 ml. of acetoxyglycoloyl chloride is added to the reaction mixture and the latter is heated gradually to 100° under a nitrogen atmosphere. After one hour, the mixture is cooled, and another 0.65 ml. of acetoxyglycoloyl chloride is added thereto. The mixture is then heated to 100° for 3 hours. After cooling, the mixture is taken up in ether, washed neutral with oxalic acid solution and then with water, dried, and concentrated. After chromatography on silica gel, 800 mg. of 17β-(O-acetylglycoloyloxy)-17α-ethynyl-4-estren-3-one is obtained, m.p. 179°-180° (from diisopropyl ether).

EXAMPLE 13

500 mg. of 17β-(O-acetylglycoloyloxy)-17α-ethynyl-4-estren-3-one is dissolved in methylene chloride/methanol (1:1), cooled to 5°, and combined under nitrogen with ethanolic KOH. After 15 minutes, the mixture is neutralized with acetic acid, stirred into ice water, and the thus-precipitated product is vacuum-filtered. After chromatography on silica gel, 420 mg. of 17α-ethynyl-17β-glycoloyloxy-4-estren-3-one is obtained, m.p. 207°-210°.

UV: $\epsilon_{240} = 17,000$.

EXAMPLE 14

100 mg. of 17α-ethynyl-17β-glycoloyloxy-4-estren-3-one is dissolved in 1 ml. of dry pyridine. Under ice cooling and under a nitrogen atmosphere, 350 mg. of O-(4-octyloxybenzoyl)glycoloyl chloride is added thereto, and the mixture is allowed to stand for 24 hours at room temperature. Then, the mixture is taken up in ether, washed with oxalic acid solution and water, and the ether phase is dried. After concentration under vacuum and chromatography of the residue on silica gel, 120 mg. of 17α-ethynyl-17β-[O-(4-octyloxybenzoyl)-glycoloyloxy]-4-estren-3-one is obtained.

EXAMPLE 15

100 mg. of 17α-ethynyl-17β-glycoloyloxy-4-estren-3-one is dissolved in 1 ml. of dry pyridine and 0.5 ml. of O-(4-octyloxycarbonylcyclohexylcarbonyl)-glycoloyl chloride is added thereto under ice cooling and nitrogen. The mixture is allowed to stand for 24 hours at room temperature, diluted with ether, and washed neutral with aqueous oxalic acid solution and then with water. After drying of the ether and concentration under vacuum, the residue is chromatographed on silica gel, thus obtaining 135 mg. of 17α-ethynyl-17β-[O -(4-octyloxycarbonylcyclohexylcarbonyl)-glycoloyloxy]-4-estren-3-one.

EXAMPLE 16

1.48 ml. of diglycolic acid monomethyl ester is added to 10 ml. of dimethyl sulfoxide and, under cooling, 1.5 ml. of trifluoroacetic anhydride is added dropwise thereto. After 1 hour, 1 g. of 17α-ethynyl-17β-hydroxy-4-estren-3-one is added to the reaction mixture, and the latter is allowed to stand for 24 hours at room temperature under nitrogen, Then, the mixture is poured into ice water and extracted with ether. After drying and evaporation, the mixture is chromatographed on silica gel, thus producing 430 mg. of 17α-ethynyl-17β-(O- methoxycarbonylmethylglycoloyloxy)-4-estren-3-one, m.p. 125°–132° (from diisopropyl ether).
UV: $\epsilon_{240} = 17,200$.

EXAMPLE 17

100 mg. of 17α-ethynyl-17β-(0-methoxycarbonylmethylglycoloyloxy)-4-estren-3-one is dissolved in 1 ml. of decanol, and then 5 mg. of potassium tert.-butylate is added to the reaction mixture and the latter is allowed to stand for 1 hour at room temperature. Acetic acid is added thereto, and the alcohol is removed under a high vacuum. The residue is chromatographed on silica gel, thus obtaining 115 mg. of 17α-ethynyl-17β-(0-decyloxycarbonylmethylglycoloyloxy)-4-estren-3-one.

EXAMPLE 18

500 mg. of 17α-ethynyl-17β-hydroxy-4-estren-3-one is dissolved in 5 ml. of freshly distilled collidine and, under ice cooling and nitrogen, 180 mg. of 4-dimethylaminopyridine and 2.1 g. of 4-undecanoyloxycyclohexanecarbonyl chloride are added thereto. The mixture is heated for 3 hours to 100°; after cooling and the addition of 2 ml. of collidine, another 1.05 g. of the acid chloride is added, and the mixture is heated for another 6 hours to 100°. After the mixture has been worked up with ether and aqueous oxalic acid solution, dried, and concentrated, there remains 600 mg. of crude product. After chromatography on silica gel, 330 mg. of 17α-ethynyl-17β-(4-undecanoyloxycyclohexylcarbonyloxy)-4-estren-3-one is obtained.

EXAMPLE 19

(a) 200 mg. of 17α-ethynyl-17β-hydroxy-4-estrene is dissolved in 2 ml. of freshly distilled collidine and then 400 mg. of acetoxyglycoloyl chloride is added under ice cooling and under a nitrogen atmosphere. The mixture is heated for 3 hours to 60°, and after cooling 200 mg. of 4-dimethylaminopyridine and another 400 mg. of the acid chloride are added. The reaction mixture is maintained for another 10 hours at 60°. After cooling, the mixture is diluted with ether, washed with aqueous oxalic acid solution and water, and the ether is dried. After chromatography on silica gel, 170 mg. of 17β-(0-acetylglycoloyloxy)-17β-ethynyl-4-estrene is obtained.

(b) 50 mg. of 17β-(0-acetylglycoloyloxy)-17α-ethynyl-4-estrene is dissolved in 1 ml. of methylene chloride and 0.5 ml. of methanol, cooled to 5°, exposed to a nitrogen atmosphere, and then 0.5 ml. of a 3% ethanolic potassium hydroxide solution is added thereto. After 15 minutes, the mixture is neutralized with acetic acid, taken up in ether, and washed neutral. After chromatography on silica gel, 35 mg. of 17α-ethynyl-17β-glycoloyloxy-4-estrene is obtained.

EXAMPLE 20

15 mg. of 17α-ethynyl-17β-glycoloyloxy-4-estrene is dissolved in 0.2 ml. of dry pyridine and then, under cooling, 100 mg. of stearoyl chloride is added thereto. The mixture is allowed to stand for 24 hours, then distilled with steam, and the residue taken up in ether and separated on analytical thin-layer plates. The desired, rapidly flowing product is made visible by spraying with primuline, and eluted, thus obtaining 17 mg. of 17α-ethynyl-17β-(0-stearoylglycoloyloxy)4-estrene.

EXAMPLE 21

500 mg. of 17α-ethynyl-17β-hydroxy-5(10)-estren-3-one is dissolved in 10 ml. of freshly distilled collidine, and 250 mg. of 4-dimethylpyridine is added thereto. After cooling to 5°, 4 g. of 0-undecanoylglycoloyl chloride is added to the mixture and the latter heated for 1 hour to 100°. The mixture is then cooled. Ether and ice-cooled aqueous oxalic acid solution are added thereto, and the mixture is washed neutral with water. The ether phase is dried, and chromatography is carried out on neutral silica gel rinsed with methanol and methylene chloride free of chlorine and chloride. A mixture of 370 mg. of 17α-ethynyl-17β-(0-undecanoylglycoloyloxy)-5(10)-estren-3-one and 17α-ethynyl-17β-(0-undecanoylglycoloyloxy)-4-estren-3-one is thus obtained.

EXAMPLE 22

500 mg. of 17α-ethynyl-3-methoxy-1,3,5(10)-estratrien-17β-ol is reacted with acetoxyglycoloyl chloride analogously to Example 12, thus obtaining 370 mg. of 17β-(0-acetylglycoloyloxy)-17α-ethynyl-3-methoxy-1,3,5(10)-estratriene, m.p. 118°–120° (from ethanol).

EXAMPLE 23

150 mg. of 17β-(0-acetylglycoloyloxy)-17α-ethynyl3-methoxy-1,3,5(10)-estratriene is reacted analogously to Example 13 with ethanolic KOH, thus obtaining 110 mg. of 17α-ethynyl-17β-glycoloyloxy-3-methoxy-1,3,5(10)-estratriene, m.p. 133°–135° (from diisopropyl ether).

EXAMPLE 24

50 mg. of 17α-ethynyl-17β-glycoloyloxy-3-methoxy1,3,5(10)-estratriene is dissolved in 1 ml. of dry pyridine, and 120 mg. of isovaleryl chloride is added thereto. The mixture is allowed to stand for 24 hours, taken up in aqueous oxalic acid solution and ether, washed neutral with water; the ether phase is dried and concentrated. After chromatography on analytical thin-layer plates, 55 mg. of 17α-ethynyl-17β-(0-isovalerylglycoloyloxy)-3-methoxy-1,3,5(10)-estratriene is obtained.

EXAMPLE 25

500 mg. of 17α-ethynyl-17β-hydroxy-1,3,5(10)-estratrien-3-ol is dissolved in 5 ml. of dry collidine, 180 mg. of 4-dimethylaminopyridine is added thereto, and under ice cooling and nitrogen, 2.2 g. of 0-undecanoylglycoloyl chloride is introduced into the reaction mixture. The latter is heated for 3 hours to 70°, stirred into aqueous oxalic acid solution, taken up in ether, and shaken for 30 minutes with excess aqueous sodium bicarbonate solution at 10°. After washing, drying and concentration of the ether phase, the product is chromatographed on silica gel, thus obtaining 420 mg. of 17α-ethynyl-17β-(0-undecanoylglycoloyloxy)-1,3,5(10)-estratrien3-ol.

EXAMPLE 26

200 mg. of 17α-ethynyl-3-cyclopentyloxy-17β-hydroxy1,3,5(10)-estratriene is dissolved in 2 ml. of dry collidine. Under ice cooling and nitrogen, 100 mg. of 4-dimethylaminopyridine and 650 mg. of 0-undecanoylglycoloyl chloride are added to the solution and the latter is heated for 3 hours to 70°. After cooling, 122 mg. of 4-dimethylaminopyridine is added thereto, and then 1 ml. of collidine and 650 mg. of the acid chloride are additionally introduced. The mixture is again heated for 12 hours to 80°. After cooling, the mixture is taken up in ether, washed neutral with aqueous oxalic acid solution and water, and after drying and evaporation, the oily residue is chromatographed on silica gel, thus obtaining 95 mg. of 17α-ethynyl-3-cyclopentyloxy-17β-(0-undecanoylglycoloyloxy)1,3,5(10)-estratriene as a colorless oil.

EXAMPLE 27

250 mg. of 17α-ethynyl-17β-hydroxy-3-(propane-2-sulfonyloxy)-1,3,5(10)-estratriene is dissolved in 2.5 ml. of dry collidine. Under ice cooling and nitrogen, 125 mg. of 4-dimethylaminopyridine and 900 mg. of 0-valerylglycoloyl chloride are added thereto. The mixture is heated for 6 hours to 90° and, after cooling, taken up in ether. After washing and drying of the ether phase, the mixture is concentrated by evaporation, and the oily residue is chromatographed on silica gel, thus obtaining 190 mg. of 17α-ethynyl-3-(isopropylsulfonyloxy)-17α-(0-valerylglycoloyloxy)-1,3,5(10)-estratriene.

EXAMPLE 28

100 mg. of 17α-ethynyl-17β-glycoloyloxy-4-estren-3-one is dissolved in 1 ml. of a mixture of benzene and triethylamine. Under agitation, 0.15 ml. of isopropylsulfonyl chloride is added to this solution at room temperature. The reaction mixture is allowed to stand for 16 hours, poured on ice, and taken up in ether after decomposition of the excess acid chloride. The mixture is washed neutral, concentrated under vacuum, the residue taken up in benzene, and filtered over silica gel. Yield: 120 mg. of 17α-ethynyl-17β-(0-isopropylsulfonylglycoloyloxy)-4-estren-3-one.

EXAMPLE 29

500 mg. of 17α-ethynyl-17β-hydroxy-4-androsten-3-one is dissolved in 5 ml. of collidine and reacted analogously to Example 26 with 0-undecanoylglycoloyl chloride, thus obtaining 370 mg. of 17α-ethynyl-17β-(0-undecanoylglycoloyloxy)-4androsten-3-one.

EXAMPLE 30

250 mg. of 3β-acetoxy-17α-ethynyl-17β-hydroxy-4-estrene is dissolved in 2.5 ml. of dry collidine and reacted analogously to Example 26 with 0-undecanoylglycoloyl chloride, thus obtaining 160 mg. of 3β-acetoxy-17α-ethynyl-17β-(0-undecanoylglycoloyloxy)-4-estrene.

EXAMPLE 31

500 mg. of 17β-(0-acetylglycoloyloxy)-17α-ethynyl-4-estren-3-one is dissolved in 15 ml. of dioxane. The reaction solution is combined with 1 ml. of ethyl orthoformate and 1.2 g. of p-toluenesulfonic acid and agitated for 6 hours at room temperature. Then, 0.5 ml. of pyridine is added; the product is precipitated in ice water and vacuum-filtered. The crude product is dissolved in benzene and filtered over a small amount of silica gel. The thus-obtained dienol ether (3-ethoxy-3,5-diene) is added to a refluxing solution of 50 ml. of benzene, 0.5 ml. of cyclopentanol, and 10 mg. of p-toluenesulfonic acid. Within 30 minutes, 5 ml. of solution is distilled off, and 0.15 ml. of pyridine is introduced into the hot solution. After cooling, the mixture is concentrated under vacuum. The residue is taken up in methylene chloride, combined with a small amount of methanol, and concentrated under vacuum, thus obtaining 125 mg. of 17β-(0-acetylglycoloyloxy)-17α-ethynyl-3-cyclopentyloxy-3,5-estradiene, m.p. 143°–156°.

EXAMPLE 32

500 mg. of 17α-ethynyl-18-ethyl-4-estren-3-one is added under nitrogen to a solution of one gram of 3-methoxyundecandedioyloxypropionic acid and 310 mg. of trifluoroacetic anhydride in 10 ml. of benzene. After 24 hours at room temperature, the solution is combined with 1 ml. of methanol and concentrated under vacuum. After chromatography on silica gel, 280 mg. of 17α-ethynyl-18-ethyl-17α-[3-(methoxyundecanedioyloxy9-propionyloxy]-4-estren-3-one is produced.

EXAMPLE 33

500 mg. of 17α-ethynyl-17β-hydroxy-18-methyl-15α,16α-methylene-4-estren-3-one is reacted with crotonic acid analogously to Example 1, thus obtaining 260 mg. of 17β(0-propionylglycoloyloxy)-17α-ethynyl-18-methyl-15α,16α-methylene-4-estren-3-one.

EXAMPLE 34

500 mg. of 17α-ethynyl-17β-hydroxy-18-methyl-15β,16βmethylene-4-estren-3-one is reacted with crotonic acid as described in Examaple 1, thus producing 370 mg. of 17β(0-propionylglycoloyloxy)-17α-ethynyl-18-methyl-15β,16βmethylene-4-estren-3-one.

EXAMPLE 35

725 g. of 4-acetoxybutyric acid is dissolved in 20 ml. of benzene, and 5 ml. of benzene is distilled off. After adding 1.1 g. of trifluoroacetic anhydride, the mixture is stirred for 1 hour at room temperature. Under nitrogen, 1 g. of 4,6-dichloro-17-hydroxy-1α,2α-methylene-4,6-pregnadiene-3,20-dione is then added thereto, and the mixture is agitated for 36 hours at room temperature. The reaction solution is decomposed with methanol and concentrated under vacuum. The residue is chromatographed on silica gel, thus obtaining 470 mg. of 17-(4-acetoxybutyryloxy)-4,6-dichloro1α,2α-methylene-4,6-pregnadiene-3,20-dione.

EXAMPLE 36

250 mg. of 17α-ethynyl-17β-hydroxy-4,9(10),11(12)-estratrien-3-one is reacted analogously to Example 7 with 3-acetoxypropionic acid, thus producing 110 mg. of 17β-(3-acetoxypropionyloxy)-17α-ethynyl-4,9(10),11(12)-estratrien-3-one.

EXAMPLE 37

250 mg. of 17α-ethynyl-17β-hydroxy-18-methyl-4,9(10),11(12)-estratrien-3-one is reacted analogously to Example 9 with ethoxyoxalyl chloride, thus obtaining 190 mg. of 17α-ethynyl-17β-(ethoxyoxalyloxy)-18-methyl-4,9(10),11(12)-estratrien-3-one.

EXAMPLE 38

1.6 g. of the monoethyl ester of malonic acid is dissolved in 10 ml. of benzene and, under nitrogen, a small amount of benzene is distilled off. After cooling to room temperature, 1.27 g. of trifluoroacetic anhydride is added thereto, and the mixture is stirred for 30 minutes at room temperature. Under ice cooling, 1 g. of 17-hydroxy-4-pregnene-3,20-dione is then added thereto. After agitating the reaction solution overnight, the solution is decomposed with methanol and concentrated under vacuum, and then stirred into ice water and taken up in methylene chloride. The methylene chloride phase is washed, dried, and concentrated, thus producing 130 mg. of 17-(ethoxymalonyloxy)-4-pregnene-3,20-dione, m.p. 119°–121° (from diisopropyl ether).
UV: $\epsilon_{239} = 18,300$.

EXAMPLE 39

Analogously to Example 38, 1 g. of 17-hydroxy-19-nor-4-pregnene-3,20-dione is reacted with malonic acid monoethyl ester. After working up the reaction mixture, 270 mg. of 17-(ethoxymalonyloxy)-19-nor-4-pregnene-3,20-dione is obtained, m.p. 121°–122° (from ethanol).
UV: $\epsilon_{239} = 17,500$.

EXAMPLE 40

A freshly prepared solution of 436 mg. of acetoxyglycolic acid anhydride in dry ether is added to a solution of 500 mg. of 17-hydroxy-6α-methyl-4-pregnene-3,20-dione in 5 ml. of dry methylene chloride under a nitrogen atmosphere. After the addition of 5 μl. of 60% perchloric acid, the reaction mixture is allowed to stand for 24 hours, then decomposed with methanol, and concentrated under vacuum at room temperature in order to avoid cleavage of the undesired 3-enol compound contained in the mixture. The residue is chromatographed on silica gel, thus obtaining 17-(O-acetylglycoloyloxy)-6α-methyl-4-pregnene-3,20-dione.

EXAMPLE 41

530 mg. of 3-acetoxypropionic acid is added to 20 ml. of benzene, and 5 ml. of benzene is distilled off. Then, 770 mg. of trifluoroacetic anhydride is added to the reaction solution, which is allowed to stand for 1 hour at room temperature. Under a nitrogen atmosphere, 1 g. of 6-chloro-17-hydroxy-1α,2α-methylene-4,6-pregnadiene-3,20-dione is added thereto. The mixture is allowed to stand for 36 hours at room temperature, decomposed with methanol, washed with sodium bicarbonate solution, and concentrated under vacuum. The residue is dissolved in 5 ml. of methylene chloride and 5 ml. of methanol, combined with ethanolic potassium hydroxide solution, and allowed to stand under nitrogen for 3 hours at +5°. After acidifying with acetic acid, ether is added, and the mixture is washed neutral. After drying and concentration, the residue is chromatographed on silica gel, thus obtaining 430 mg. of 17-(3-acetoxypropionyloxy)-6-chloro-1α,2α-methylene-4,6-pregnadiene-3,20-dione, m.p. 196°–198° (from ethyl acetate).
UV: $\epsilon_{283} = 16,900$.

EXAMPLE 42

375 mg. of thiodiglycolic acid is suspended in 20 ml. of benzene, and 500 mg. of trifluoroacetic anhydride is added thereto. After one hour of agitation, 400 mg. of 4,6-dichloro-17-hydroxy-4,6-pregnadiene-3,20-dione is added thereto, and the mixture is allowed to stand for 24 hours at room temperature. Then, the mixture is stirred into ice water, brought to pH 8 with sodium hydroxide solution, and extracted with ether. The aqueous phase is then acidified with 2N sulfuric acid. The thus-precipitated product is dissolved in methanol and heated under reflux for 1 hour. After cooling, the methanol is removed under vacuum, and the precipitated product is vacuum-filtered and then washed with water until the thiodiglycolic acid has been eliminated. The product is dried under vacuum, thus obtaining 260 mg. of 17-(carboxymethylthioacetoxy)-4,6-dichloro-4,6-pregnadiene-3,20-dione.

EXAMPLE 43

500 mg. of 17α-ethynyl-17β-hydroxy-4-estren-3-one is dissolved in 5 ml. of dry collidine, and under ice cooling and an $N_2$ atmosphere, 800 mg. of α-acetoxyisobutyryl chloride is added thereto. The mixture is heated for 3 hours to 70°, cooled, and 2 ml. of collidine is additionally introduced. The reaction mixture is combined with 180 mg. of 4-dimethylaminopyridine and another 0.8 g. of the acid chloride. After heating once more to 70° for a period of 16 hours, the mixture is cooled and worked up analogously to Example 12, thus obtaining 270 mg. of 17β-(O-acetyldimethylglycoloyloxy)-17α-ethynyl-4-estren-3-one.

EXAMPLE 44

50 mg. of 17-(carboxymethylthioacetoxy)-4,6-dichloro-4,6-pregnadiene-3,20-dione is dissolved in 5 ml. of an ether/tetrahydrofuran mixture, and an ethereal diazomethane solution is added. The mixture is allowed to stand for 1 hour, concentrated, and chromatographed on silica gel, thus obtaining 51 mg. of 4,6-dichloro-17-(methoxycarbonylmethylthioacetoxy)-4,6-pregnadiene-3,20-dione.

EXAMPLE 45

500 mg. of 6-chloro-17-hydroxy-1α,2α-methylene-4,6-pregnadiene-3,20-dione is reacted with ethoxyoxalyl chloride analogously to Example 9, thus obtaining 420 mg. of 17-(ethoxyoxalyloxy)-6-chloro-1α,2α-methylene-4,6-pregnadiene-3,20-dione, m.p. 193° (from diisopropyl ether).

EXAMPLE 46

Oily Solution for Intramuscular Injection with Long-Term Effect

The injection solution is prepared according to customary methods under sterile conditions from the following components:
5000 mg. of 17α-ethynyl-18-methyl-17β-(O-undecanoylglycoloyloxy)-4-estren-3-one is dissolved in a mixture of castor oil/benzyl benzoate (6:4) so that a volume of 100 ml. is obtained. The solution is charged in 1 ml. portions into ampoules, each of which contains 50 mg. of active agent.

EXAMPLE 47

Crsytal Suspension for Intramuscular Injection with Long-Term Effect

The suspension is produced according to conventional methods and sterilized.
2000 mg. of 17α-ethynyl-17β-(O-heptanoylglycoloyloxy)-18-methyl-4-estren-3-one having a particle size of <20 μ. is suspended in a physiological NaCl solution containing 85 mg. of "Myrj 53"* so that a volume of 100 ml. is obtained. The suspension is charged in 1 ml. portions into ampoules and then sterilized. Each ampoule contains 20 mg. of active agent.
*Atlas Chemical Industries, Inc. polyoxyethylene derivative of fatty acids.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A depot steroid ester of the formula,

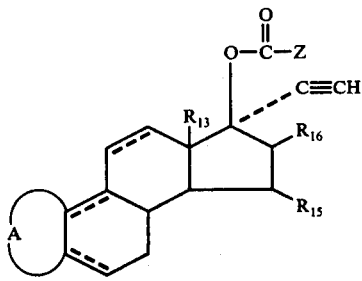

wherein $R_{13}$ is alkyl of 1-3 carbon atoms; ⋯ each are a single or double bond;

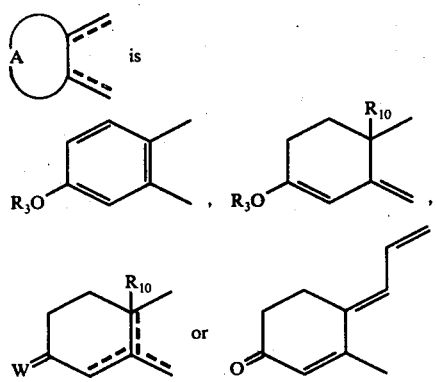 is $R_{10}$ is hydrogen or methyl;
$R_3$ is hydrogen, alkanoyl of up to 4 carbon atoms, alkylsulfonyl of up to 4 carbon atoms, alkyl of up to 4 carbon atoms, or cycloalkyl of 3-8 carbon atoms;
W is $H_2$, O, or H, $OR_3$;

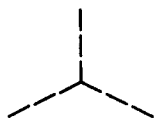

is a double bond in the 4,5- , 5,6-, or 5,10-position;
$R_{15}$ and $R_{16}$ each are hydrogen or collectively are α- or β-methylene or an additional carbon-carbon bond between the carbon atoms at the 15- and 16-position;
Z is alkenyl of up to 4 carbon atoms, X—OH, Y—CO—OH, X—O—CO—Y—CO—OH, X—O—CO—R, Y—CO—OR, X—O—CO—Y—CO—OR, or X—O—SO₂—R;
X is a straight-chain or branched alkylene, oxaalkylene or thiaalkylene of 1-6 carbon atoms, unsubstituted or substituted by —OH, —O—CO—R, or —O—SO₂—R;
Y is a direct bond, a straight-chain or branched alkylene, oxaalkylene or thiaalkylene of 1-3 carbon atoms when Y is linked at the 17-position of the steroid residue via —O—CO—; alkylene, oxaalkylene or thiaalkylene of 1-16 carbon atoms, unsubstituted or substituted by an —OH, —OCOR, or —OSO₂R, when Y is linked to X via —O—CO—; or 1,4-phenylene, 1,4-cyclohexylene or 1,3-cyclopentylene substituted by up to two alkyl of 1-2 carbon atoms; and R is alkyl or oxaalkyl of up to 22 carbon atoms.

2. A depot steroid ester of the formula

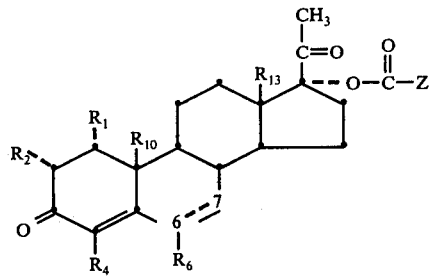

wherein $R_{10}$ is H or methyl;
$R_{13}$ is alkyl of 1-3 carbon atoms;
$R_1$ and $R_2$ each are hydrogen or collectively are methylene or a further carbon-carbon bond between carbon atoms at the 1- and 2-positions;
$R_4$ is hydrogen or chlorine;
$R_6$ is hydrogen, chlorine or methyl;
6⋯7 is a single or double bond between the carbon atoms at the 6- and 7-positions;
Z is alkenyl of up to 4 carbon atoms, X—OH, X—O—CO—OH, X—O—CO—R, Y—CO—OR, X—O—CO—Y—CO—OR, or X—O—SO₂R;
X is a straight-chain or branched alkylene, oxaalkylene or thiaalkylene of 1-6 carbon atoms, unsubstituted or substituted by —OH, —O—CO—R, or —O—SO₂R;
Y is alkylene, oxaalkylene or thioalkylene of 1-16 carbon atoms, unsubstituted or substituted by an —OH, —OCOR, or —OSO₂R, when Y is linked to X via —O—CO—; or 1,4-phenylene, 1,4-cyclohexylene or 1,3-cyclopentylene substituted by up to two alkyl of 1-2 carbon atoms; and
R is alkyl or oxaalkyl of up to 22 carbon atoms.

3. A compound of claim 1, wherein Z is —CH₂OH.

4. 17α-Ethynyl-17β-crotonoyloxy-18-methyl-4-estren-3-one, a compound of claim 1.

5. 17α-Ethynyl-3,3-(2,2-dimethyltrimethylenedioxy)-17β-glycoloyloxy-18-methyl-5- and -5(10)-estrene, a compound of claim 1.

6. 17α-Ethynyl-18-methyl-17β-(O-propionylglycoloyloxy)-4-estren-3-one;
17α-ethynyl-17β-(O-heptanoylglycoloyloxy)-18-methyl-4-estren-3-one;
17α-ethynyl-18-methyl-17β-(O-undecanoylglycoloxy)-4-estren-3-one;
17α-ethynyl-17β-glycoloyloxy-18-methyl-4-estren-3-one;
17β-(O-acetylglycoloyloxy)-17α-ethynyl-4-estren-3-one;
17α-ethynyl-17β-glycoloyloxy-4-estren-3-one;
17α-ethynyl-17β-(O-undecanoyloxyglycoloyloxy)-4-estren-3-one;
17α-ethynyl-17β-(O-tridecanoylglycoloyloxy)-4-estren-3-one;
17α-ethynyl-17β-(O-hexadecanoylglycoloyloxy)-4-estren-3-one;

17α-ethynyl-17β-(O-octadecanoylglycoloyloxy)-4-estren-3-one; 17α-ethynyl-17β-(O-tridecanoylglycoloyloxy)-18-methyl-4-estren-3one, or 17α-ethynyl-17β-[O-(3-cyclopentylpropionyl)-glycoloyloxy]-18-methyl-4-estren-3-one, a compound of claim 1.

7. 17α-Ethynyl-17β-(2-nonanoyloxypropionyloxy)-18-methyl-4-estren-3-one; 17β-(3-acetoxypropionyloxy)-17α-ethynyl-18-methyl-4-estren-3-one, or 17α-ethynyl-17β-(3-hydroxypropionyloxy)18-methyl-4-estren-3-one, a compound of claim 1.

8. 17α-Ethynyl-17β-(ethoxymalonyloxy)-18-methyl-4-estren-3-one or 17α-ethynyl-17β-(dodecyloxymalonyloxy)-18-methyl-4-estren-3-one, a compound of claim 1.

9. 17α-Ethynyl-17β-(ethoxyoxalyloxy)-4-estren-3-one or 17α-ethynyl-17β-(butoxyoxalyloxy)-4-estren-3-one, a compound of claim 1.

10. 17α-Ethynyl-17β-(O-10-methyl-3,6,9-trioxaundecanoylglycoloyloxy)-4-estren-4-estren-3-one, a compound of claim 1.

11. 17α-Ethynyl-17β-[O-(4-octyloxybenzoyl)-glycoloyloxy]-4-estren-3-one, a compound of claim 1.

12. 17α-(Ethynyl-17β-[O-(4-octyloxycarbonylcyclohexylcarbonyl)-glycoloyloxy]-4-estren-3-one, a compound of claim 1.

13. 17α-Ethynyl-17β-(O-methoxycarbonylmethylglycoloyloxy)-4-estren-3-one or 17α-ethynyl-17β-(O-decycloxycarbonylmethylglycoloyloxy)-4-estren-3-one, a compound of claim 1.

14. 17α-Ethynyl-17β-(4-undecanoyloxycyclohexylcarbonyloxy)-4-estren-3-one, a compound of claim 1.

15. 17β-(O-Acetylglycoloyloxy)-17α-ethynyl-4-estrene; 17α-ethynyl-17β-glycoloyloxy-4-estrene; 3β-acetoxy-17α-ethynyl-17β-(O-undecanoylglycoloyloxy)-4-estrene; or 17α-ethynyl-17β-(O-stearoylglycoloyloxy)-4-estrene, a compound of claim 1.

16. 17α-Ethynyl-17β-(O-undecanoylglycoloyloxy)-5(10)-estren-3-one, a compound of claim 1.

17. 17β-(O-Acetylglycoloyloxy)-17α-ethynyl-3-methoxy-1,3,5(10)-estratriene; 17α-ethynyl-17β-glycoloyloxy-3-methoxy-1,3,5(10)-estratriene; 17α-ethynyl-17β-(O-isovaleryglycoloyloxy)-3-methoxy-1,3,5(10)-estratriene, or 17α-ethynyl-3-cyclopentyloxy-17β-(O-undecanoylglycoloyloxy)-1,3,5(10-estratriene, a compound of claim 1.

18. 17α-Ethynyl-17β-(O-undecanoylglycoloyloxy)-1,3,5(10) -estratrien-3-ol, a compound of claim 1.

19. 17β-Ethynyl-3-(isopropylsulfonyloxy)-17β-(O-valeryglycoloyloxy)-1,3,5(10)-estratriene, a compound of claim 1.

20. 17α-Ethynyl-17β-(O-isopropylsulfonylglycoloyloxy)-4-estren-3-one, a compound of claim 1.

21. 17α-Ethynyl-17β-(O-undecanoylglycoloyloxy)-4-androsten-3-one, a compound of claim 1.

22. 17β-(O-Acetylglycoloyloxy)-17α-ethynyl-3-cyclopentyloxy-3,5-estradiene, a compound of claim 1.

23. 17α-Ethynyl-18-ethyl-17β-[3-(methoxyundecanedioyloxy)- propionyloxy]-4-estren-3-one, a compound of claim 1.

24. 17β-(O-Acetylglycoloyloxy)-17α-ethynyl-18-methyl-15α,16α-methylene-4-estren-3-one; 17β(O-acetylglycoloyloxy)-17α-ethynyl-18-methyl-15β,16β-methylene-4-estren-3-one; 17β-O-propionylglycoloyloxy)-17α-ethynyl-18-methyl-15α,16α-methylene-4-estren-3-one or 17β-(O-propionylglycoloyloxy)-17α-ethynyl-18-methyl-15α,16α-methylene-4-estren-3-one, a compound of claim 1.

25. 17-(4-Acetoxybutyryloxy)-4,6-dichloro-1α,2α-methylene-4,6-pregnadiene-3,20-dione, a compound of claim 2.

26. 17β-(3-Acetoxypropionyloxy)-17α-ethynyl-4,9(10), 11(12)-estratrien-3-one, a compound of claim 1.

27. 17α-Ethynyl-17β-(ethoxyoxalyloxy)-18-methyl-4,9(10),11(12)-estratrien-3-one, a compound of claim 1.

28. 17-(Ethoxymalonyloxy)-4-pregnene-3,20-dione or 17-(ethoxymalonyloxy)-19-nor-4-pregnene-3,20-dione, a compound of claim 1.

29. 17-(O-Acetylglycoloyloxy)-6α-methyl-4-pregnene-3,20-dione, a compound of claim 1.

30. 17-(3-Acetoxypropionyloxy)-6-chloro-1α,2α-methylene-4,6-pregnadiene-3,20-dione, a compound of claim 1.

31. 17β-(O-Acetyldimethylglycoloyloxy)-17α-ethynyl-4-estren-3-one, a compound of claim 1.

32. 17-(Ethoxyoxalyloxy)-6-chloro-1α,2α-methylene-4,6-pregnadiene-3,20-dione, a compound of claim 2.

33. 17α-Ethynyl-17β-(O-tridedanoylglycoloyloxy)-18-methyl-4,15-estradien-3-one, a compound of claim 1.

34. A depot pharmaceutical composition, comprising a compound of claim 1, in admixture with a pharmaceutically acceptable carrier.

35. A process for the preparation of a compound of claim 3, by the steps of
(a) reacting a 17-hydroxy steroid with crotonic acid in the presence of trifluoroacetic anhydride to obtain a 17-crotonic acid ester;
(b) blocking any keto groups present by ketalization;
(c) oxidizing with potassium permanganate in the presence of formic acid at temperatures around the freezing point to obtain a 2,3-dihydroxybutyric acid ester;
(d) cleaving the dihydroxybutyric acid oxidatively with periodate to obtain a 17-glyoxylic acid ester;
(e) reducing the 17-glyoxylic acid ester with alkali metal boranate or lithium tri-tert.-butoxyalanate to a 17-glycolic acid ester; and
(f) liberating any blocked keto groups.

36. 17-(Carboxymethylthioacetoxy)-4,6-dichloro-4,6-pregnadiene-3,20-dione or 4,6-dichloro-17-(methoxycarbonylmethylthioacetoxy)-4,6-pregnadiene-3,20-dione.

37. A depot pharmaceutical composition, comprising a compound of claim 2, in admixture with a pharmaceutically acceptable carrier.

* * * * *

UNITED STATES PATENT AND TRADEMARK OFFICE
CERTIFICATE OF CORRECTION

PATENT NO. : 4,119,626
DATED : October 10, 1978
INVENTOR(S) : PAUL-BERHARD ET AL It is certified that error appears in the above-identified patent and that said Letters Patent are hereby corrected as shown below:

Claim 1, line 19: "each are"
should read --- ---- each are ---

Claim 1, lines 55 and 56: "X-OH, Y-CO-OH,"
should read --- X-OH, ---

Claim 2, 12th line below formula: "X-O-CO-OH, X-O-CO-R, Y-CO-OR"
should read --- X-O-CO-Y-CO-OH, X-O-CO-R ---

Claim 19, line 1: "17β-Ethynyl-"
should read --- 17α-Ethynyl- ---

Signed and Sealed this

Third Day of April 1979

[SEAL]

Attest:

RUTH C. MASON
Attesting Officer

DONALD W. BANNER
Commissioner of Patents and Trademarks